United States Patent
Flankl et al.

(10) Patent No.: US 10,298,107 B2
(45) Date of Patent: May 21, 2019

(54) NON-CONTACT POWER GENERATOR

(71) Applicant: NABTESCO CORPRATION, Tokyo (JP)

(72) Inventors: Michael Flankl, Zurich (CH); Arda Tueysuez, Zurich (CH); Johann W. Kolar, Zurich (CH); Yusuke Tsukada, Hyogo (JP); Kazuhito Nakamura, Hyogo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 15/834,663

(22) Filed: Dec. 7, 2017

(65) Prior Publication Data

US 2018/0159414 A1    Jun. 7, 2018

Related U.S. Application Data

(63) Continuation of application No. PCT/JP2016/067205, filed on Jun. 9, 2016.

(30) Foreign Application Priority Data

Jun. 10, 2015  (JP) ................................ 2015-117771

(51) Int. Cl.
*H02K 35/02* (2006.01)
*H02K 49/02* (2006.01)
*H02K 17/42* (2006.01)

(52) U.S. Cl.
CPC ............. *H02K 35/02* (2013.01); *H02K 17/42* (2013.01); *H02K 49/02* (2013.01)

(58) Field of Classification Search
CPC ............................... H02K 35/00; H02K 35/02
See application file for complete search history.

(56) References Cited

U.S. PATENT DOCUMENTS 5,347,186 A * 9/1994 Konotchick ......... H02K 7/1876
                                                310/17
8,299,659 B1 * 10/2012 Bartol, Jr. ............. H02K 53/00
                                                310/152

(Continued)

FOREIGN PATENT DOCUMENTS

| GB | 2479926 A | 11/2011 |
| JP | 59-67864 A | 4/1984 |
| JP | 2000-134905 A | 5/2000 |

OTHER PUBLICATIONS

International Preliminary Report on Patentability and Written Opinion of the International Searching Authority dated Dec. 12, 2017, in PCT/JP2016/067205.

(Continued)

*Primary Examiner* — Dang D Le
(74) *Attorney, Agent, or Firm* — Pillsbury Winthrop Shaw Pittman, LLP

(57) ABSTRACT

A non-contact power generator includes: a magnet disposed at a distance to a main surface of a moving body that moves in one direction and the opposite direction, and the magnet generating a magnetic flux passing the main surface; a coil being separated from a surface of the magnet that faces away from the main surface, the coil being linked with the magnetic flux from the magnet; and a magnetic flux guide member disposed in a part of a magnetic path of the magnetic flux linked with the coil. The magnet is moved along the shaft in the moving direction of the moving body at a speed lower than the speed of the moving body by a reaction force acting on the magnet on a basis of eddy currents generated in the main surface in such a direction as to hinder a change of the magnetic flux from the magnet.

20 Claims, 10 Drawing Sheets

(56) References Cited

U.S. PATENT DOCUMENTS

| | | | |
|---|---|---|---|
| 8,604,649 B1 * | 12/2013 | Bartol, Jr. ............. | H02K 53/00 310/36 |
| 8,816,541 B1 * | 8/2014 | Bristow ................ | H02K 35/02 310/113 |
| 2012/0049659 A1 * | 3/2012 | Gregory ................ | A63F 13/06 310/15 |
| 2014/0132155 A1 | 5/2014 | Strothmann | |

OTHER PUBLICATIONS

International Search Report PCT/JP2016/067205 dated Aug. 23, 2016 with English translation.
Partial Supplementary European Search Report dated Jan. 23, 2019 issued in corresponding EP Application No. 16807554.7.

* cited by examiner

NON-CONTACT POWER GENERATOR

CROSS-REFERENCE TO RELATED APPLICATIONS

This application is based upon and claims the benefit of priority from the prior Japanese Patent Application No. 2015-117771, filed on Jun. 10, 2015, the entire contents of which are incorporated herein by reference.

TECHNICAL FIELD

The present invention relates to a non-contact power generator which generates electric power contactlessly.

BACKGROUND

A bicycle dynamo that generates electricity contactlessly is disclosed in United States Patent Application Publication No. 2014/0132155 ("the '155 Publication"). In a bicycle dynamo of the '155 Publication, an outer peripheral surface of annular permanent magnet that rotates about a rotation axis extending in a direction orthogonal to a rotation axis of a bicycle wheel is spaced apart from a side surface of the wheel that is continues with an outer peripheral surface of the wheel.

In the permanent magnet, magnetic poles are aligned in the circumferential direction and the magnetization directions of adjacent magnetic poles are opposite to one another. For example, when the wheel rotates with the N pole of the permanent magnet facing the side surface of the wheel, eddy currents are generated on the side surface of the wheel in such a direction as to hinder the change of the magnetic flux from the permanent magnet. A repulsive force and attractive force between the magnetic flux generated by the eddy currents and the magnetic flux from the permanent magnet cause the permanent magnet to rotate in the rotation direction of the wheel.

Thus, when a coil is wound around the permanent magnet and the magnetic flux from the permanent magnet is linked with the coil, it is possible to obtain an induced electric power from the coil.

However, the bicycle dynamo disclosed in the '155 Publication has the following drawbacks.

1. Due to a limited area of the permanent magnet opposed to a side surface of the wheel, the amount of magnetic coupling between the wheel and the permanent magnet cannot be increased. Accordingly eddy currents generated in the wheel cannot be increased, and a rotational force of the permanent magnet becomes relatively weak.

2. In the '155 Publication, a single phase coil is wound around the permanent magnet. However, with the single phase coil, the magnetic flux from a part of the permanent magnet where the coil is not wound cannot be effectively utilized and the amount of the linkage magnetic flux cannot be increased. Moreover, in the case where the polarities of portions of the permanent magnet where the coil is wound around are symmetrical with respect to the rotation axis, the net amount of the magnetic fluxes linked with the coil is always canceled out so that it is not possible to generate electric power.

3. Because the magnetic flux from the permanent magnet propagates in the air, it receives a large magnetic resistance and therefore a high magnetic efficiency cannot be obtained.

4. Because a yoke is not utilized, leakage of magnetic flux is likely to occur. Further when an electrically conductive material is placed therearound, a magnetic path is changed by the material and it may affect the power generation amount.

In view of the above-described drawbacks, it is an object of the invention to provide a non-contact power generator with high magnetic efficiency and less leakage of magnetic flux.

SUMMARY

According to one aspect of the invention, provided is a non-contact power generator that includes; a magnet opposed at a distance to a main surface of a moving body that moves in one direction and an direction opposite to the one direction, the magnet being movable along a shaft that extends in the moving direction of the moving body, and the magnet generating a magnetic flux that passes the main surface; a coil disposed at a distance from a surface of the magnet that faces away from the main surface of the moving body, the coil being linked with the magnetic flux from the magnet and a magnetic flux guide member disposed in at least a part of a magnetic path of the magnetic flux linked with the coil. The magnet is moved along the shaft in the moving direction of the moving body at a speed lower than a moving speed of the moving body by a reaction force acting on the magnet on a basis of eddy currents generated in the main surface of the moving body in such a direction as to hinder a change of the magnetic flux from the magnet.

The distance between the main surface of the moving body and a surface of the magnet opposed to the main surface may be constant while the magnet moves along the shaft.

According to another aspect of the invention, provided is a non-contact power generator that includes; a magnet opposed at a distance to a main surface of a moving body in which convex portions and concave portions are alternately arranged on the main surface, the moving body moving or reciprocating in a direction in which the convex portions and the concave portions are arranged, the magnet being movable along a shaft that extends in the moving direction of the moving body, and the magnet generating a magnetic flux that passes the main surface; a biasing member biasing the magnet along the shaft a coil disposed at a distance from a surface of the magnet that faces away from the main surface of the moving body, the coil being linked with the magnetic flux from the magnet and a magnetic flux guide member disposed in at least a part of a magnetic path of the magnetic flux linked with the coil. When the magnet is opposed to the convex portion, the magnet is moved along the shaft in the moving direction of the moving body by a reaction force that acts on the magnet on a basis of eddy currents generated in the convex portion or by a reluctance force acting between the convex portion and a surface of the magnet opposed to the convex portion or by both the reaction force and the reluctance force, and when the magnet is opposed to the concave portion, the magnet is moved in a direction opposite to the moving direction of the moving body by a bias force of the biasing member.

According to another aspect of the invention, provided is a non-contact power generator that includes: a magnet opposed at a distance to a flat main surface of a moving body in which first portions and second portions are alternately arranged on the main surface, the second portions have a magnetic permeability and/or an electric conductivity lower than that/those of the second portions, the moving body moving in a direction in which the first portions and the second portions are arranged, the magnet being movable along a shaft that extends in the moving direction of the moving body, and the magnet generates a magnetic flux that passes the main surface; a biasing member biasing the magnet along the shaft; a coil disposed at a distance from a surface of the magnet that faces away from the main surface of the moving body, the coil being linked with the magnetic flux from the magnet; and a magnetic flux guide member disposed in a part of a magnetic path of the magnetic flux linked with the coil. When the magnet is opposed to the first portion, the magnet is moved along the shaft in the moving direction of the moving body by a reaction force that acts on the magnet on a basis of eddy currents generated in the first portion or by a reluctance force acting between the convex portion and a surface of the magnet opposed to the first portion or by both the reaction force and the reluctance force, and when the magnet is opposed to the second portion, the magnet is moved in a direction opposite to the moving direction of the moving body by a bias force of the biasing member.

When the magnetic permeability of the moving body is higher than a first threshold value and the electric conductivity is lower than a second threshold value, the magnet is moved by the reluctance force rather than the reaction force.

The coil may have a planar shape that is disposed in a direction intersecting a direction of the magnetic flux from the magnet. The magnetic flux guide member is disposed on a side opposite to the magnet with the coil interposed therebetween.

According to another aspect of the invention, provided is a non-contact power generator that includes: a magnet opposed at a distance to a main surface of a moving body in which convex portions and concave portions are alternately arranged on the main surface, the moving body moving in a direction in which the convex portions and the concave portions are arranged, the magnet being rotatable around a shaft that extends in a direction intersecting the moving direction of the moving body, and the magnet is magnetized in a direction toward the main surface or in a direction opposite thereto; a biasing member biasing the magnet in a rotation direction of the shaft a coil disposed at a distance from a surface of the magnet that faces away from the main surface of the moving body, the coil being linked with the magnetic flux from the magnet and a magnetic flux guide member disposed in at least a part of a magnetic path of the magnetic flux linked with the coil. When the magnet is opposed to the convex portion, the magnet is rotated around the shaft in a rotation direction according to the moving direction of the moving body by a reaction force that acts on the magnet on a basis of eddy currents generated in the convex portion or by a reluctance force acting between the convex portion and a surface of the magnet opposed to the convex portion or by both the reaction force and the reluctance force, and when the magnet is opposed to the concave portion, the magnet is rotated around the shaft in a direction opposite to the rotation direction by a bias force of the biasing member.

According to another aspect of the invention, provided is a non-contact power generator that includes: a magnet disposed at a distance from a flat main surface of a moving body in which first portions and second portions are alternately arranged on the main surface, the second portions have a magnetic permeability and/or an electric conductivity lower than that/those of the first portions, the moving body moving in a direction in which the first portions and the second portions are arranged, the magnet being rotatable around a shaft that extends in a direction intersecting the moving direction of the moving body, and the magnet is magnetized in a direction toward the main surface or the opposite direction; a biasing member biasing the magnet in a rotation direction of the shaft a coil disposed at a distance from a surface of the magnet that faces away from the main surface of the moving body, the coil being linked with the magnetic flux from the magnet; and a magnetic flux guide member disposed in a part of a magnetic path of the magnetic flux linked with the coil. When the magnet is opposed to the first portion, the magnet is rotated around the shaft in a rotation direction according to the moving direction of the moving body by a reaction force that acts on the magnet on a basis of eddy currents generated in the first portion or by a reluctance force acting between the first portion and a surface of the magnet opposed to the first portion or by both the reaction force and the reluctance force, and when the magnet is opposed to the second portion, the magnet is rotated around the shaft in a direction opposite to the rotation direction by a bias force of the biasing member.

The magnet may have a cylindrical body disposed on an outer peripheral surface side of the shaft. The coil may be disposed in a circular arc surface shape along at least a part of an outer peripheral surface of the magnet. The magnetic flux guide member may be opposed to a surface of the coil that faces away from the magnet.

According to another aspect of the invention, provided is a non-contact power generator that includes: a magnet opposed at a distance to a main surface of a moving body that moves in a first direction; a biasing member biasing the magnet in the first direction or a direction opposite to the first direction; a shaft member disposed at a distance from the magnet and extending in a second direction intersecting the first direction; a connecting member connected to the magnet and the shaft member for rotating the magnet around the shaft member; and a coil with which a magnetic flux of the magnet is linked. While the moving body is moving in the first direction, the magnet oscillates in the first direction and a direction opposite to the first direction by a reaction force acting on the magnet on a basis of eddy currents generated in the main surface of the moving body in such a direction as to hinder a change of the magnetic flux from the magnet and by a bias force of the biasing member.

The magnet may be a permanent magnet or an electromagnet.

DESCRIPTION OF THE PREFERRED EMBODIMENTS

Embodiments of the invention will be now described with reference to the accompanying drawings. In the following embodiments, distinctive configurations and operations of a non-contact power generator will be mainly described. However the non-contact power generator may include configurations and operations that are omitted in the following description. Note that the omitted configurations and operations may also be included in the scope of the embodiment.

First Embodiment

Figure 1:
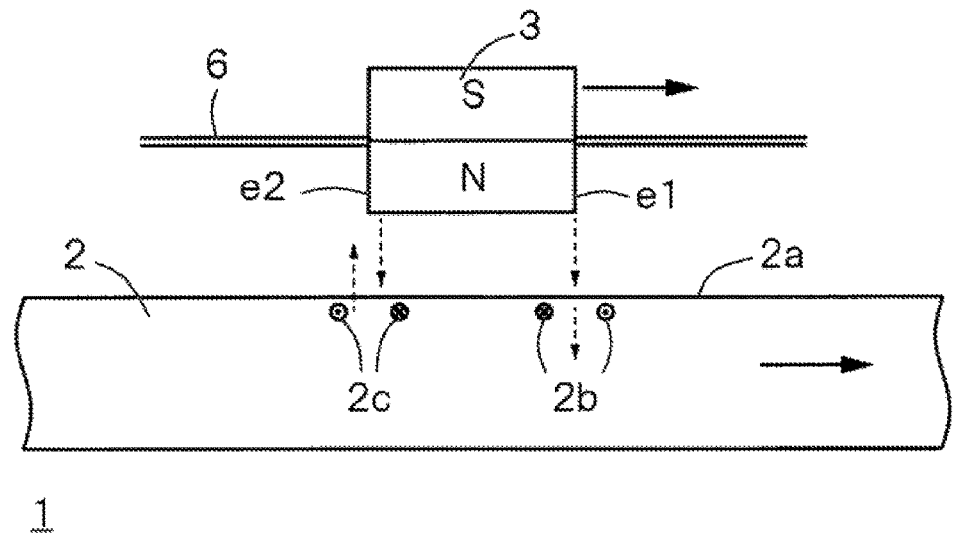
FIG. 1 is a front view of a non-contact power generator according to a first embodiment of the invention.
Figure 2:
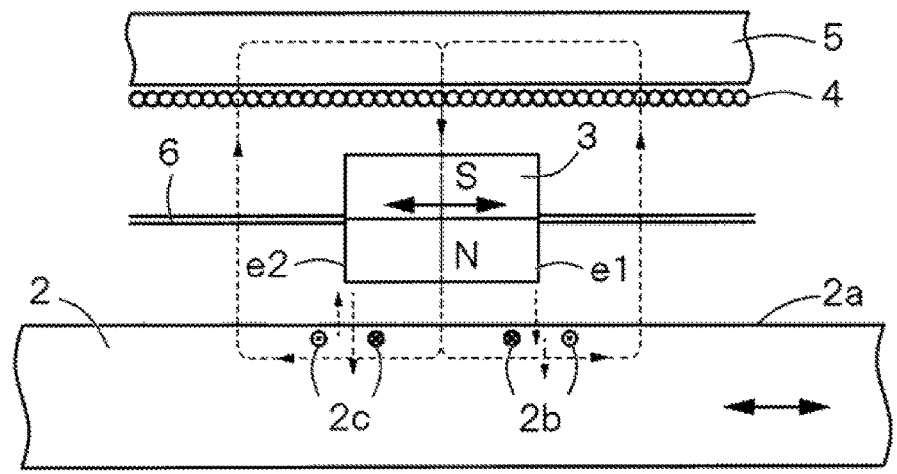
FIG. 2 is a schematic diagram showing flows of magnetic fluxes of the non-contact power generator of FIG. 1.

FIG. 1 is a front view of a non-contact power generator 1 according to the first embodiment of the invention, and FIG. 2 is a schematic diagram showing flows of magnetic fluxes of the non-contact power generator 1 of FIG. 1. The non-contact power generator 1 of FIG. 1 includes a magnet 3 disposed so as to be separated from a main surface 2a of a moving body 2.

The moving body 2 is movable in two directions, which are one direction and a direction opposite to the one direction. The moving body 2 has the flat main surface 2a. A shaft member 6 extending in the moving direction of the moving body 2 is disposed above the main surface 2a such that it is spaced apart from the main surface 2a. The magnet 3 is guided by the shaft member 6 and freely movable along the moving direction of the moving body 2. A gap (air gap) is provided between the magnet 3 and the main surface 2a of the moving body 2. Even when the magnet 3 and the moving body 2 move, this gap remains constant.

The magnet 3 is movably supported by the shaft member 6. The mechanism for supporting the magnet 3 by the shaft member 6 is not particularly limited, but for example, the shaft member 6 may be inserted in a hole penetrating the central portion of the magnet 3 to movably support the magnet 3. Alternatively, the magnet 3 may be disposed on one or more shaft members 6 and the magnet 3 may be moved in the extending direction of the shaft member 6.

The magnet 3 has one or more magnetic poles and magnetic fluxes from the magnetic pole(s) pass the main surface 2a of the moving body 2. In order to allow the magnetic flux(es) from the magnet 3 to pass through the main surface 2a of the moving body 2, it is preferable to minimize the gap between the main surface 2a and a magnetic-pole end surface of the magnet 3 opposed to the main surface 2a of the moving body 2.

When the moving body 2 moves in one direction or in the opposite direction, eddy currents are generated on the main surface 2a of the moving body 2 to generate a magnetic flux in such a direction as to hinder a change of a magnetic flux from the magnet 3. A repulsive force and an attractive force generated between the magnetic flux from the eddy currents and the magnetic flux from the magnet 3 cause the magnet 3 to move in the same direction as the moving body 2 along the extending direction of the shaft member 6. For example, when the moving body 2 moves to the right side in FIG. 1, the magnet 3 also moves to the right side accordingly, and when the moving body 2 moves to the left side in FIG. 1, the magnet 3 also moves to the left side accordingly. The magnet 3 moves at a speed lower than the moving speed of the moving body 2.

A coil 4, for example, is needed for the non-contact power generator 1 of FIG. 1 to generate electric power. FIG. 2 illustrates the coil 4 to which magnetic fluxes from the magnet 3 are linked, and a yoke (magnetic flux guide member) 5 through which magnetic fluxes from the magnet 3 pass added in the contactless power generator 1 of FIG. 1. The yoke 5 is optional and may be omitted therefrom. When the N pole of the magnet 3 is opposed to the main surface 2a of the moving body 2 and the S pole is opposed to the coil 4, for example, the magnetic fluxes from the N pole of the magnet 3 pass the air gap and reach the main surface 2a of the moving body 2 as indicated by the broken line arrow line in FIG. 2. The magnetic fluxes are then linked with the coil 4 via the air gap, and subsequently they pass through the interior of the yoke 5. The magnetic fluxes are again linked with the coil 4 and finally enter into the S pole.

The coil 4 is disposed at a place where all the magnetic fluxes from the magnet 3 pass therethrough, for example, right above the magnet 3 as shown in FIG. 1. The distance between the coil 4 and the magnet 3 is preferably made as small as possible. The coil 4 is formed in a planar shape that extends in the moving direction of the magnet 3, for example. More specifically, the coil 4 may be formed from a spiral conductive pattern provided on a substrate surface that extends along the moving direction of the magnet 3. The conductive pattern may be formed on the outer surface of the yoke 5, for example.

When the magnet 3 moves along the shaft member 6, the magnetic flux linked with the coil 4 changes in terms of time. As a result, an electromotive force is induced in such a direction as to hinder the change of the magnetic flux, and an induced current flows in the coil 4. That is, electric power is generated at both ends of the coil 4, and power can be obtained by extracting the electric power. It is possible to generate an induced electromotive force caused by the induced current.

The induced electromotive force "E" generated in the coil 4 can be calculated as follows. Assuming that the temporal change of the magnetic flux is sinusoidal, the number of turns of each coil 4 is "n" [turns], the magnetic flux linked with the coil 4 is $\varphi$ [Wb], the maximum value of the magnetic flux is $\varphi max$, the frequency in which the magnetic flux $\varphi$ changes is "f" [Hz], and the angular frequency is $\omega=2\pi f$, then the magnetic flux $\varphi$ is represented by the following formula (1).

$$\varphi = \varphi max \times \sin \omega t \tag{1}$$

The voltage "e" [V] induced in the coil 4 is represented by the following formula (2).

$$e = -n(d\varphi/dt) \quad (2)$$

Substituting the formula (1) into the formula (2) yields the following formula (3).

$$e = -n\omega\varphi \max \cos \omega t \quad (3)$$

"nωφmax" in the formula (3) represents the maximum value (amplitude) of the induced voltage "e". The effective value "E" of the voltage is expressed by the following formula (4).

$$E = n(2\pi f)\varphi \max /\sqrt{2} \quad (4)$$

In the formula (4), $2\pi/\sqrt{2} \approx 4.44$.
Therefore, the formula (4) is expressed by the formula (5).

$$E \approx 4.44 \, fn \, \varphi \max \quad (5)$$

The frequency "f" in the formula (5) depends on the cycle in which the magnet 3 moves in the both directions or the rotation period of the magnet 3. Therefore, as can be seen from the formula (5), the induced electromotive force E in the coil 4 is proportional to multiplication of the moving cycle in which the magnet 3 moves in the both directions or the rotation period of the magnet 3, the number of turns "n" of the coil 4, and the magnetic flux φ that is linked with the coil 4.

As described above, the moving body 2 is moved by utilizing eddy currents generated in the main surface 2a of the moving body 2. In order to generate eddy currents in the main surface 2a of the moving body 2, it is necessary that at least the main surface 2a of the moving body 2 is formed of a conductive material. The entire moving body 2 may be formed of a conductive material. Alternatively a base member of the moving body 2 may be formed of an insulating material and a conductive material may be coated on the insulating material.

Hereinafter, how the magnet 3 is moved will be described with reference to FIG. 2. Mechanisms described hereunder are also applicable to the non-contact power generator 1 of FIG. 1 in which the coil 4 and the yoke 5 are not provided. When the moving body 2 moves in a predetermined direction, an eddy current 2b is generated in an area of the main surface 2a of the moving body 2 right under an edge e1 of the magnet 3 located in front of the moving body 2 in its moving direction. At the same time, an eddy current 2c is generated in an area of the main surface 2a of the moving body 2 right under the edge e2 of the magnet 3 located in rear of the moving body 2 in the moving direction. The direction of the eddy current 2b and the direction of the eddy current 2c are different from each other. The eddy current 2b flows in such a direction that a magnetic flux is generated in the same direction as the magnetic flux from the edge e1 of the magnet 3. Whereas the eddy current 2c flows in such a direction that a magnetic flux is generated in a direction opposite to the magnetic flux from the edge e2 of the magnet 3. The eddy currents 2b, 2c flow in such a direction that a change in the magnetic flux of the magnet 3 caused by the movement of the moving body 2 is inhibited.

Since the direction of the magnetic flux caused by the eddy current 2b and the direction of the magnetic flux from the N pole of the magnet 3 are the same, an attractive force that attracts each other works on the front side in the moving direction of the moving body 2. Whereas on the rear side in the moving direction of the moving body 2, since the direction of the magnetic flux by the eddy current 2c and the direction of the magnetic flux from the N pole of the magnet 3 are opposite to each other, a repulsive force that repels each other works. When a moving speed of the magnet 3 is lower than a moving speed of the moving body 2, the above-mentioned directions of the eddy currents 2b and 2c are always realized. Consequently, the magnet 3 moves at a lower speed than the moving body 2 such that it follow the moving body 2.

It should be noted that the above-described mechanism in which the magnet 3 moves can also be explained by a reaction force due to the Lorentz force. As described above, the direction of the eddy current 2b generated by the magnetic flux from the edge e1 that is situated on the front side in the rotation direction of the N pole of the magnet 3 and the direction of the eddy current 2c generated by the magnetic flux from the edge e2 that is situated on the rear side in the rotation direction of the magnet 3 are opposite to each other. Therefore a current always flows through a portion of the moving body 2 that is situated directly under the N pole in a given direction. When the moving body 2 moves in the direction of the arrow (to the right) in FIG. 2, the current resulting from the eddy currents 2b, 2c is subjected to the Lorentz force of the opposite direction (to the left). Therefore, the magnet 3 that receives the magnetic flux generated by the eddy currents 2b, 2c is moved by the reaction force of the Lorentz force in the moving direction of the moving body 2. As a result, the magnet 3 and the moving body 2 move in the same direction.

Figure 3A:
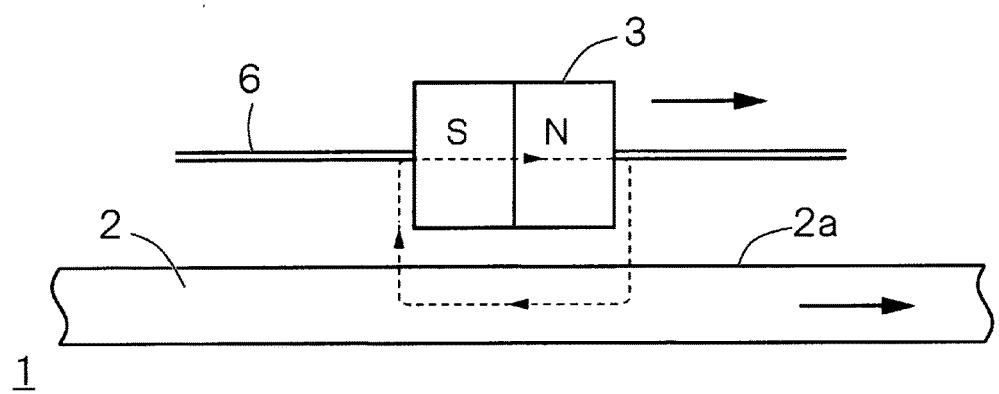
FIG. 3A illustrates an example in which the two magnetic poles of a magnet are arranged substantially parallel with a main surface of a moving body.
Figure 3B:
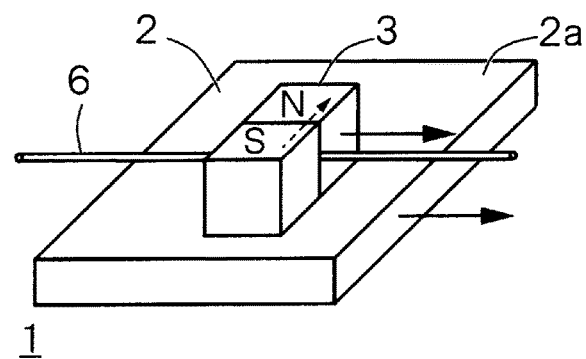
FIG. 3B illustrates an example in which the two magnetic poles of the magnet are arranged substantially parallel with the main surface of the moving body and oriented in a direction different from the moving direction of the moving body.
Figure 3C:
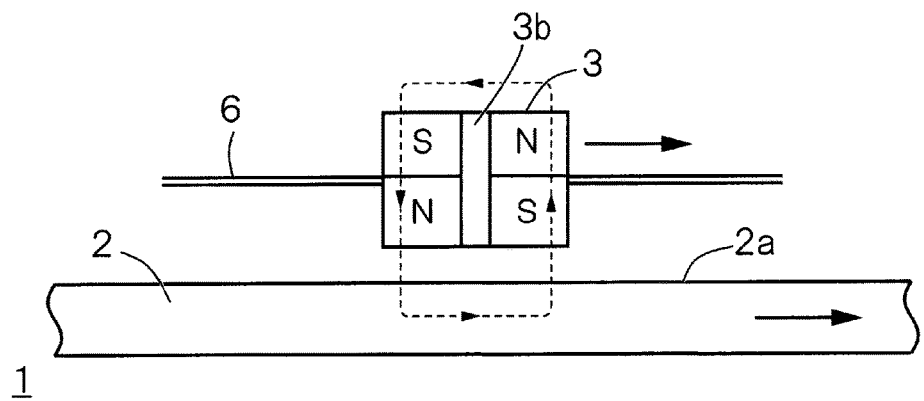
FIG. 3C illustrates an example in which four magnetic poles are provided in the magnet, and two magnetic poles having different polarities are arranged in a direction normal to the main surface of the moving body.
Figure 3D:
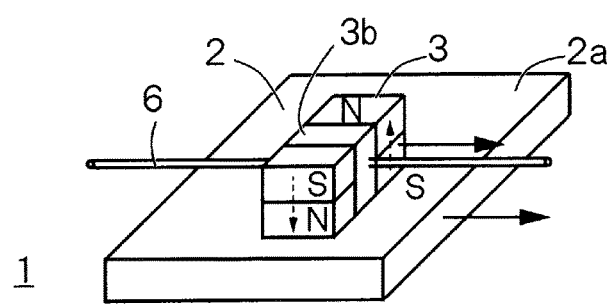
FIG. 3D illustrates an example in which magnetic poles are arranged in directions different from those in FIG. 3C by about 90 degrees.

In the embodiment, the kinetic energy caused by the movement of the moving body 2 is extracted by the magnet 3. The kinetic energy extracted by the magnet 3 is converted into an electric energy by the coil 4. By bringing one magnetic-pole end surface of the magnet 3 as close as possible to the main surface 2a of the moving body 2 and bringing the other magnetic-pole end surface of the magnet 3 as close as possible to the coil 4, it is possible to reduce a magnetic resistance and a leakage magnetic flux, which leads to an efficient power generation. FIGS. 1 and 2 illustrated the example in which the two magnetic poles of the magnet 3 are disposed in the direction normal to the main surface 2a of the moving body 2. However, other arrangements of the magnetic poles are also possible. For example, FIG. 3A illustrates an example in which the two magnetic poles of the magnet 3 are arranged substantially parallel with the main surface 2a of the moving body 2. FIG. 3B illustrates an example in which the two magnetic poles of the magnet 3 are arranged substantially parallel with the main surface 2a of the moving body 2 and oriented in a direction different from the moving direction of the moving body 2. FIG. 3C illustrates an example in which four magnetic poles are provided in the magnet 3, and two magnetic poles having different polarities are arranged in a direction normal to the main surface 2a of the moving body 2. Between the two magnetic poles adjacent in the main surface direction, a fixing member 3b for fixing the magnetic poles is provided. FIG. 3D illustrates an example in which magnetic poles are arranged in directions different from those in FIG. 3C by about 90 degrees. In any of FIGS. 3A to 3D, the magnetic flux from the magnet 3 passes over the main surface 2a of the moving body 2. Therefore, eddy currents can be generated in the main surface 2a when the moving body 2 moves, and the magnet 3 can be moved in the extending direction of the shaft member 6 by the reaction force of the eddy currents.

As described above, in the first embodiment, the magnet 3 is movable along the shaft member 6 extending in the moving direction of the moving body 2, and the magnet 3 is separated from the main surface 2a of the moving body 2 by a gap. In this way, it is possible to generate eddy currents in the main surface 2a of the moving body 2. The repulsive force and the attractive force generated between the magnetic flux from the eddy currents and the magnetic flux from the magnet 3 cause the magnet 3 to move in the same direction as the moving body 2 along the extending direction of the shaft member 6. Thereby, without using the power source, the magnet 3 can be moved in the both direction along the extending direction of the shaft member 6 in a non-contact manner.

In the embodiment, since the magnetic pole surface of the magnet 3 is opposed closely to the main surface 2a of the moving body 2, the area of the magnetic pole surface of the magnet 3 is increased and thereby it is possible to increase the amount of magnetic flux that passes the main surface 2a and is linked with the coil 4. As a result, it is possible to increase the induced electromotive force. It is also possible to increase the induced electromotive force by enhancing the magnetic force of the magnet 3.

Further, according to the embodiment, with the simple configuration in which the magnet 3 that is freely movable in the extending direction of the shaft member 6 is disposed close to the main surface 2a of the moving body 2, the moving body 2 can be moved in both directions along the shaft member 6 without a power source. Therefore it is possible to move the moving body 2 in a contactless manner at a place where an external power supply is not provided.

As long as the moving body 2 is moved relative to the magnet 3 in the embodiment, the moving body 2 itself may not necessarily move. However, in order to generate the induced electromotive force in the coil 4, it is necessary for the moving body 2 to perform bidirectional movement with a given cycle.

Second Embodiment

In the second embodiment, the magnet 3 is bidirectionally oscillated while the moving body 2 moves in one direction.

Figure 4:
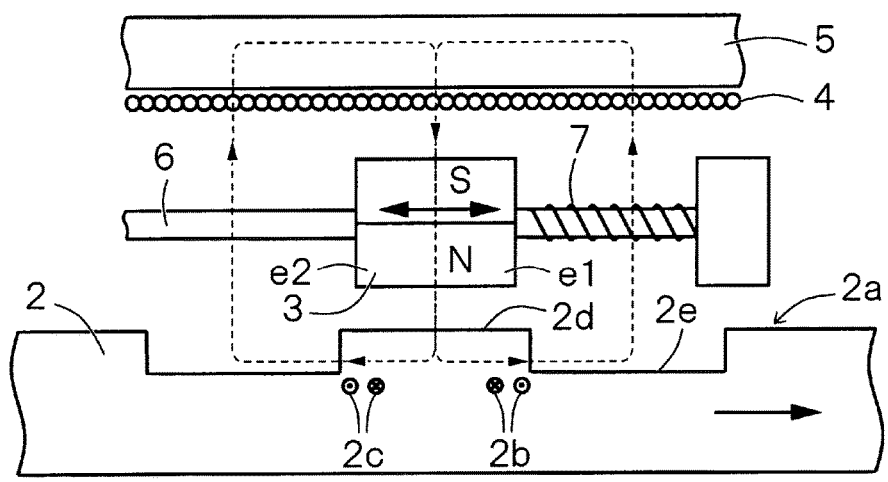
FIG. 4 is a front view of a non-contact power generator according to a second embodiment of the invention.

FIG. 4 is a front view of a non-contact power generator according to the second embodiment of the invention. The non-contact power generator 1 of FIG. 4 includes the magnet 3 disposed apart from the main surface 2a of the moving body 2, the coil 4 with which magnetic fluxes from the magnet 3 are linked, and the yoke 5 which the magnetic fluxes from the magnet 3 passes.

The main surface 2a of the moving body 2 has a concave-convex pattern in which convex portions 2d and concave portions 2e are alternately arranged. The moving body 2 moves along the direction in which the convex portions 2d and the concave portions 2e are arranged. It should be noted that the moving body 2 may move not only in the direction of the arrow in FIG. 4 but also move in the opposite direction. In other words, the magnet 3 do not move in the both directions unless the moving body 2 moves in the both directions in the first embodiment. Whereas in the second embodiment, the magnet 3 can be moved in the both directions even when the moving body 2 moves in only one direction.

Similarly to the first embodiment, the magnet 3 is movable bidirectionally in the extending direction of the shaft member 6. However a biasing member 7 made of a spring or the like is attached to the magnet 3 in this embodiment. The biasing member 7 expands and contracts in the extending direction of the shaft member 6. For example, when the magnet 3 moves to the right in FIG. 4, the biasing member 7 contracts, and a bias force that urges the magnet 3 to move to the left is exerted by the biasing member 7. Whereas when the magnet 3 moves to the left in FIG. 4, the biasing member 7 extends and a bias force that urges the magnet 3 to move to the right is exerted by the biasing member 7.

Although FIG. 4 shows an example in which only one biasing member 7 is provided, the biasing members 7 may be provided on both sides of the magnet 3 on the shaft member 6. When the biasing members 7 are provided on both sides of the magnet 3, one of the two biasing members 7 contracts and the other of the two basing member 7 expands when the magnet 3 moves in the moving direction of the moving body 2. Consequently the bias force that urges the magnet 3 to return to the original direction is exerted by the biasing member 7. Therefore, even if the bias force of each biasing member 7 is weak, it is possible to return the magnet 3 to the original position. Moreover it is possible to reduce the size of each biasing member 7.

In this embodiment, as will be described later, the magnet 3 can be moved based on the repulsive force and the attractive force caused between the magnetic flux by the eddy currents and the magnetic flux from the magnet 3 (hereinafter referred to as a reaction force by the eddy currents). It is also possible to move the magnet 3 on a basis of a reluctance force acting between the magnetic flux from the magnet 3 and the main surface 2a of the moving body 2. Here, the reluctance force is an attractive force acting between the magnet 3 and a substance that has a high magnetic permeability. In this embodiment, as the mechanism of moving the magnet 3, the following three patterns are conceivable.

1. The magnet 3 is moved by utilizing the reaction force by the eddy currents without using the reluctance force.

2. The magnet 3 is moved by utilizing the reluctance force without using the reaction force by the eddy currents.

3. The magnet 3 is moved by utilizing both the reaction force by the eddy currents and the reluctance force.

When the main surface 2a of the moving body 2 has the concave-convex pattern, the convex portions 2d of the main surface 2a are situated closer to the magnet 3 than the concave portions 2e, so that a higher reluctance force works on the convex portions 2d than the concave portions 2e. Therefore, when the moving body 2 moves in one direction in a state where the convex portion 2d of the main surface 2a is opposed to the magnet 3, the magnet 3 follows the convex portion 2d and moves in the moving direction of the moving body 2. At this point, the magnet 3 contracts the biasing member 7, and the biasing member 7 accumulates a bias force that urges the magnet 3 to return to the original position.

The magnet 3 receives the reluctance force between the magnet 3 and the convex portion 2d that urges the magnet 3 to move in the moving direction of the moving body 2, and the bias force exerted by the biasing member 7 that urges the magnet 3 to move in the direction opposite to the moving direction of the moving body 2. As the amount of movement of the magnet 3 increases, the bias force is gradually accumulated and increased. And the magnet 3 stops moving in the moving direction of the moving body 2 at the position where the bias force and the reluctance force are balanced. When the moving body 2 continues to move in this state, the magnet 3 and the concave portion 2e eventually are opposed to each other. In this state, the reluctance force becomes weaker and the bias force becomes larger than the reluctance force, so that the magnet 3 moves in the direction opposite to the moving direction of the moving body 2 by the bias force of the biasing member 7.

By the bias force of the biasing member 7, the magnet 3 is returned to the position where the magnet 3 is opposed to the next convex portion 2d of the main surface 2a of the moving body 2. At this point, the bias force of the biasing member 7 in the direction opposite to the moving direction of the moving body 2 is weaker than that of the point at which the bias force is balanced with the reluctance force in the moving direction of the moving body 2. Consequently the magnet 3 again moves in the moving direction of the moving body 2 by the reluctance force.

In order to allow the reluctance force to act between the magnet 3 and the main surface 2a of the moving body 2, the main surface 2a needs to have a high magnetic permeability. When the main surface 2a is formed of a material with a low magnetic permeability like aluminum, the reluctance force hardly works.

When it is desired to move the magnet 3 by utilizing only the reaction force caused by the eddy currents without utilizing the reluctance force, it is preferable that the main surface 2a of the moving body 2 be formed of a material with a low magnetic permeability and a high electric conductivity. More specifically, the main surface 2a may be formed of a material whose magnetic permeability is lower than a first threshold value and whose electric conductivity is higher than a second threshold value. When it is desired to move the magnet 3 by utilizing the reluctance force without utilizing the reaction force caused by the eddy currents, it is preferable that the main surface 2a of the moving body 2 be formed of a material with a high magnetic permeability and a low conductivity. More specifically, the main surface 2a may be formed of a material whose magnetic permeability is higher than the first threshold value and whose conductivity is lower than the second threshold value. This is because eddy currents do not occur when the electric conductivity is low. Moreover, when it is desired to move the magnet 3 by utilizing both of the reaction force by the eddy currents and the reluctance force, it is preferable that the main surface 2a of the movable body 2 be formed of a material with a high magnetic permeability and a high electric conductivity. More specifically it may be formed of a material whose magnetic permeability and electric conductivity are higher than predetermined threshold values respectively.

Next, the mechanism of moving the magnet 3 by utilizing the reaction force by the eddy currents will be described. When the convex portion 2d of the main surface 2a of the moving body 2 is opposed to the magnet 3, the eddy current 2b flows in the convex portion 2d disposed right under the edge e1 of the magnet 3 that is situated on the front side in the moving direction such that the eddy current generates a magnetic flux in the same direction as that of the magnet 3. At the same time, in the convex portion 2d disposed right under the edge e2 situated on the rear side in the moving direction of the magnet 3, the eddy current 2c flows such that it generates a magnetic flux in the direction opposite to the magnetic flux from the magnet 3. As a result, an attractive force that attracts the convex portion 2d acts on the edge e1 side of the magnet 3, and a repulsive force that repels the convex portion 2d acts on the edge e2 side of the magnet 3. Accordingly, the magnet 3 moves in the same direction as the moving body 2 at a lower speed than the moving body 2 to follow the moving body 2. At this point, the magnet 3 expands and contracts the biasing member 7, and the biasing member 7 accumulates a bias force that urges the magnet 3 to return to the original position.

Since a moving speed of the moving body 2 is different from a moving speed of the magnet 3, the magnet 3 eventually is opposed to the concave portion 2e of the main surface 2a of the moving body 2. Once the magnet 3 is opposed to the concave portion, the distance between the magnet 3 and the main surface 2a is increased, so that the eddy currents generated in the concave portion 2e of the main surface 2a also become small. Consequently both the above-described attractive force and repulsive force become weak. Accordingly, the magnet 3 moves in the direction opposite to the moving direction of the moving body 2 by the bias force of the biasing member 7.

By the bias force of the biasing member 7, the magnet 3 is returned to the position where the magnet 3 is opposed to the next convex portion 2d of the main surface 2a of the moving body 2. When the magnet 3 is opposed to the convex portion 2d, the reaction force caused by the eddy currents becomes strong again, so that the magnet 3 moves in the moving direction of the moving body 2.

By repeating the above operation, the magnet 3 moves in the moving direction of the moving body 2 and moves in the opposite direction, in other words, oscillates along the moving direction of the moving body by utilizing at least the reluctance force or the reaction force or both of the reluctance force and the reaction force by the eddy currents even when the moving body 2 moves only in one direction.

As shown in FIG. 4, in the vicinity of the magnet 3, disposed are the coil 4 with which a magnetic flux from the magnet 3 is linked and the yoke 5 which a magnetic flux passes. Since the magnet 3 moves in both directions in the plane where the coil 4 is formed, the magnetic flux linked with the coil 4 varies with time and an electromotive force is induced in the coil 4.

In the first embodiment, since the magnet 3 can move only in the moving direction of the moving body 2, once the magnet 3 passed the area where the coil 4 is disposed, it is not possible to induce an electromotive force in the coil 4 unless the moving direction of the moving body 2 is switched. Whereas in the second embodiment, since the magnet 3 moves back and forth in the area where the coil 4 is disposed even when the moving body 2 always moves in the same direction, it is possible to keep inducing an electromotive force in the coil 4 without changing the moving direction of the moving body 2. Therefore, the practicality is improved as compared with the first embodiment.

As described above, the main surface 2a of the moving body 2 has the concave-convex pattern, but a specific example of the moving body 2 may be a gear member whose outer peripheral surface has a concave-convex pattern. By disposing the magnet 3 of FIG. 4 close to the outer peripheral surface of the gear member, it is possible to perform power generation without an external power supply. The generated electric power can be used, for example, as a power supply for a sensor that detects the rotation speed of the gear member. In this case, it is not necessary to use a power cable to connect the sensor to the power supply, and the speed of the gear member can be monitored without an external power supply.

The direction of the magnetic pole of the magnet 3 shown in FIG. 4 is merely an example, and the magnetic poles may be oriented as shown in FIGS. 3A to 3D. However, in order to effectively utilize the reluctance force or the reaction force caused by the eddy currents, which is generated by the concave-convex pattern on the main surface 2a of the moving body 2, the size of the magnet 3 is preferably determined such that it fits within the area of the convex portion 2d of the moving body 2. Further, in order to generate the required amount of electric power, a plurality of non-contact power generators capable of generating an optimum amount of power may be connected to each other.

As described above, in the second embodiment, the convex portions 2d and the concave portions 2e are alternately provided on the main surface 2a of the moving body 2. When the magnet 3 is opposed to the convex portion 2*d* the magnet 3 is moved in the moving direction of the moving body 2 by at least the reaction force caused by the eddy currents or the reluctance force or both the reaction force and the reluctance force, and the bias force is accumulated in the biasing member 7. When the magnet 3 is opposed to the concave portion 2*e*, the magnet 3 is moved in the direction opposite to the moving direction of the moving body 2 by the bias force of the biasing member 7. Thus, according to the second embodiment, it is possible to move (oscillate) the magnet 3 in both directions while the moving body 2 is moved in one direction.

Third Embodiment

In the third embodiment, the magnet 3 is rotated.

Figure 5:
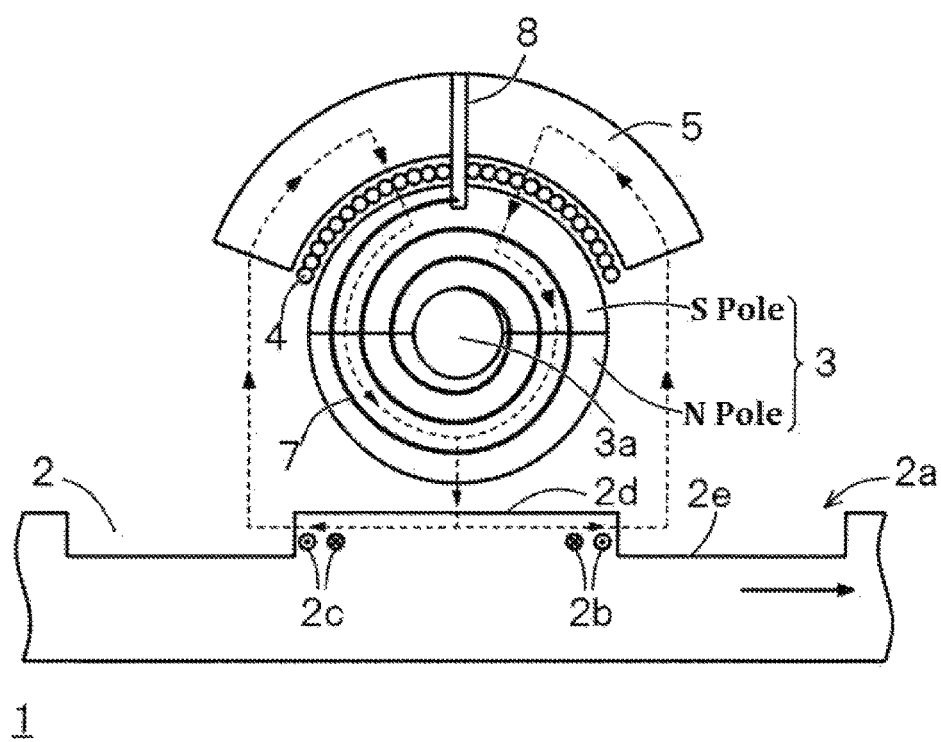
FIG. 5 is a front view of a non-contact power generator according to a third embodiment of the invention.
Figure 6:
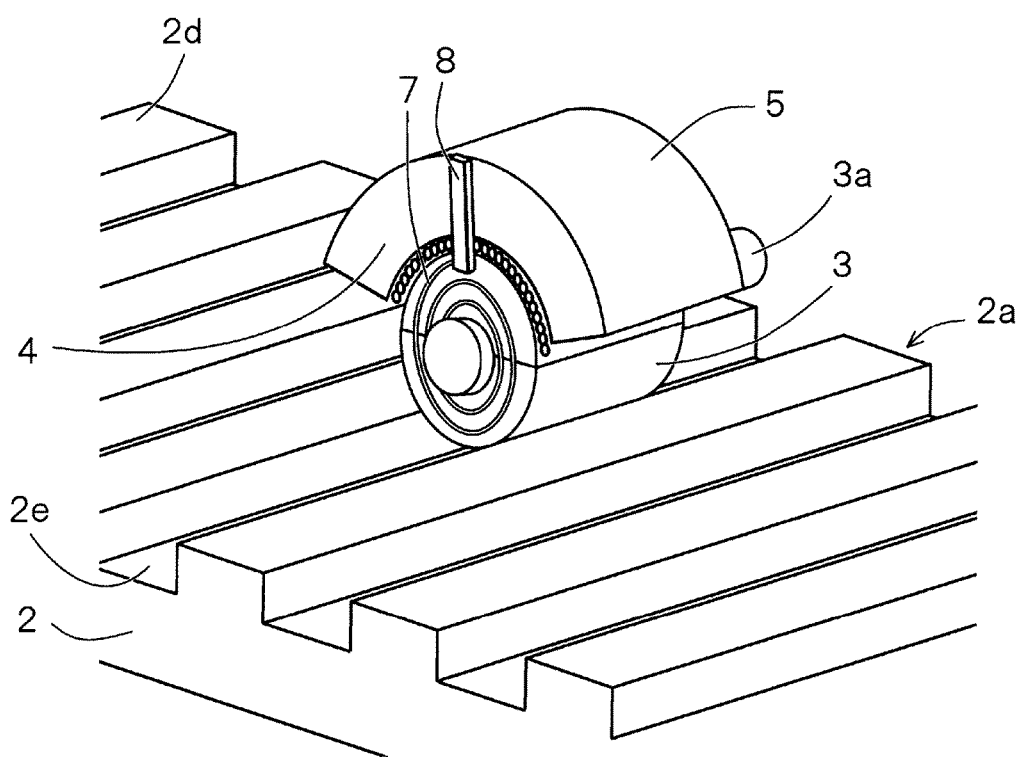
FIG. 6 is a perspective view of the non-contact power generator according to the third embodiment of the invention.

FIG. 5 is a front view of a non-contact power generator 1 according to the third embodiment, and FIG. 6 is a perspective view of the non-contact power generator. The non-contact power generator 1 of FIG. 5 includes the magnet 3 disposed apart from the main surface 2*a* of the moving body 2, the coil 4 with which magnetic fluxes from the magnet 3 are linked, and the yoke 5 which the magnetic fluxes from the magnet 3 passes.

On the main surface 2*a* of the moving body 2, the convex portions 2*d* and the concave portion 2*e* are alternately arranged as in the second embodiment, and the moving body 2 moves in the direction in which the convex portions 2*d* and the concave portions 2*e* are arranged.

Similarly to the second embodiment, in the third embodiment, the magnet 3 is rotated by utilizing at least the reaction force caused by the eddy currents or the reluctance force or both.

The magnet 3 in FIG. 5 has a hollow cylindrical shape, and a shaft member 3*a* is inserted in the hollow portion. The magnet 3 is rotatable together with the shaft member 3*a* about the shaft member 3*a*. A part of an outer peripheral surface of the magnet 3 is opposed at a distance to the main surface 2*a* of the moving body 2. The magnet 3 may have, for example, two magnetic poles. A portion of the magnet 3 disposed closer to the moving body 2 with respect to the shaft member 3*a* has the N pole and a portion of the magnet disposed closer to the coil 4 has the S pole. The coil 4 is separated by a gap and opposed to a part of the outer peripheral surface of the magnet 3. The coil 4 is disposed at a uniform distance from the outer peripheral surface of the magnet 3. Therefore, the coil 4 is arranged in a circular arc surface shape. The yoke 5 is opposed to the surface of the coil 4 that faces away from the magnet 3. The cross section of the yoke 5 is formed in a circular arc shape in accordance with the shapes of the magnet 3 and the coil 4.

The biasing member 7 is attached to at least one end surface of the magnet 3 in the shaft end direction of the shaft member 3*a*. The biasing member 7 is supported by the yoke 5 through a support member 8. The specific structure of the biasing member 7 and the mounting position of the biasing member 7 on the magnet 3 may be different from those described above and any structures or positions are possible.

When the magnet 3 rotates around the shaft member 3*a*, the biasing member 7 accumulates a bias force in a direction opposite to the rotation direction of the magnet 3. The magnet 3 is rotated by at least the reaction force caused by the eddy currents or the reluctance force or both of the reaction force and the reluctance force. However, when the rotational force that rotates the magnet 3 becomes weaker than the bias force, the magnet 3 rotates in the opposite direction by the bias force.

For example, a case where the reluctance force acts between the magnet 3 and the main surface 2*a* of the moving body 2 will be described. When the magnet 3 is opposed to the convex portion 2*d* of the main surface 2*a* of the moving body 2, the magnet 3 is attracted to the convex portion 2*d*. Therefore, when the moving body 2 moves in one direction, the magnet 3 rotates in the moving direction of the moving body 2 such that the magnet 3 follows the moving body 2. At the same time, a bias force that urges the magnet 3 to rotate in the reverse direction is accumulated in the biasing member 7. For example, when the moving body 2 moves to the right, the magnet 3 rotates counterclockwise as shown in FIG. 5. When the magnet 3 is eventually opposed to the concave portion 2*e* of the main surface 2*a* of the moving body 2, since the distance between the magnet 3 and the main surface 2*a* increases, the reluctance force becomes weaker than the biasing force. Thus the magnet 3 is rotated in the reverse direction (clockwise in the case illustrated in FIG. 5) by the bias force of the biasing member 7.

While the moving body 2 is moving in one direction, the magnet 3 is opposed to the convex portion 2*d* and the concave portion 2*e* alternately so that the above-described operations are alternately repeated. Accordingly the magnet 3 rotates around the shaft member 3*a* in one direction and the reverse direction alternately. Consequently, the magnetic flux linked with the coil 4 changes, and an electromotive force is induced in the coil 4.

Figure 7:
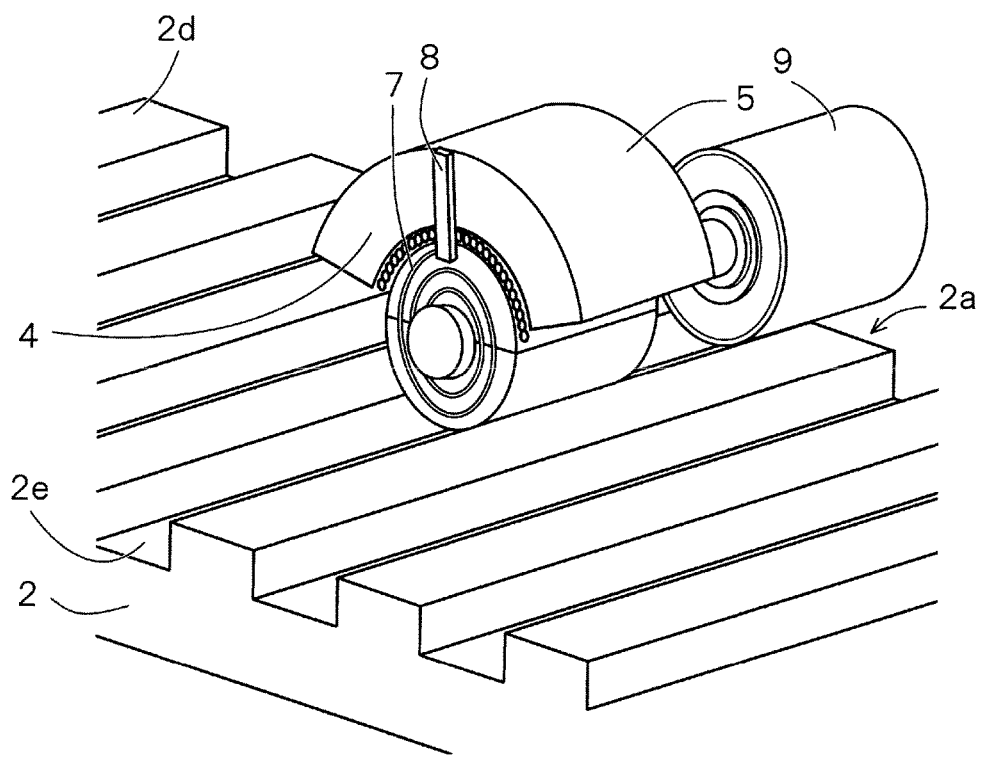
FIG. 7 is a perspective view of the non-contact power generator of FIG. 6 in which a standard electric machine is connected.

Next, a case where a reaction force caused by eddy currents acts between the magnet 3 and the main surface 2*a* of the moving body 2 will be described. When the magnet 3 is opposed to the convex portion 2*d* of the main surface 2*a* of the moving body 2, two eddy currents with different current directions are generated near the position closest to the magnet 3 on the convex portion 2*d*. By a repulsive force and an attractive force between the magnetic flux caused by the eddy currents and the magnetic flux from the magnet 3, that is, a reaction force generated by the eddy currents, the magnet 3 is rotated in the moving direction of the moving body 2 at a circumferential speed lower than the surface speed of the main surface 2*a* of the moving body. And a bias force that urges the magnet 3 to return to the original rotational position acts on the biasing member 7. When the magnet 3 is opposed to the concave portion 2*e* of the main surface 2*a* after it was opposed to the convex portion 2*d*, the bias force becomes larger than the reaction force caused by the eddy currents therefore the magnet 3 rotates in the reverse direction. In this way, similar to the rotation of the magnet 3 by the reluctance force, the magnet 3 rotates in one direction and the reverse direction alternately around the shaft member 3*a* while the moving body 2 is moving in one direction, Since the magnet 3 in FIG. 5 rotates around the shaft member 3*a*, for example, a standard electric machine 9 as shown in FIG. 7 may be connected to the shaft member 3*a*. The standard electric machine 9 is a drive member that is driven by the rotation of the shaft member 3*a*. The drive member includes, for example, a rotor (not shown) that rotates together with the shaft member 3*a* and a stator (not shown). A load is driven by rotation of the rotor. More specifically, the drive member may be a generator, a reducer, or the like. Further, the drive member may be a compressor that compresses air by utilizing the rotational force of the shaft member 3*a*. Thus, the drive member includes not only those converting the rotational force of the shaft member 3*a* into an electric force but also those converting the rotational force of the shaft member 3*a* into a mechanical force.

Similarly to the second embodiment, the non-contact power generator 1 according to the third embodiment, may also be disposed close to the outer peripheral surface of the moving body 2, which includes, for example, a gear member, it is possible to use the non-contact power generator to supply power for a sensor that detects the rotational speed of the gear member.

The direction of the magnetic pole of the magnet 3 shown in FIG. 5 is merely an example, and the magnetic poles may be oriented as shown in FIGS. 3A to 3D. However, in order to effectively utilize the reluctance force or the reaction force caused by the eddy currents, which is generated by the concave-convex pattern on the main surface 2a of the moving body 2, the size of the magnet 3 is preferably determined such that it fits within the area of the convex portion 2d of the moving body 2. Further, in order to generate the required amount of electric power, a plurality of non-contact power generators capable of generating an optimum amount of power may be connected to each other.

As described above, in the third embodiment, by merely moving the moving body 2 in one direction, it is possible to cause the cylindrical magnet 3 to rotationally oscillate around the shaft member 3a in one direction and the reverse direction alternately. Therefore, it is possible to periodically change the magnetic flux linked with the coil 4 that is opposed to the outer peripheral surface of the magnet 3. Accordingly it is possible to efficiently generate inductive power in the coil 4.

Further, in the third embodiment, the coil 4 is disposed along the outer circumferential surface of the cylindrical magnet 3 and the coil 4 rotates around the shaft member 3a while the magnet 3 does not move. Therefore it is possible to reduce the dimension of the non-contact power generator 1 in the left-right direction as compared with the second embodiment. Therefore, according to the third embodiment, it is possible to provide the non-contact power generator 1 which is space-saving and excellent in power generation efficiency.

Fourth Embodiment

In the above-described second and third embodiments, the examples in which the main surface 2a of the moving body 2 has a concave-convex pattern have been described. Alternatively the main surface 2a of the movable body 2 may be a flat surface.

Figure 8:
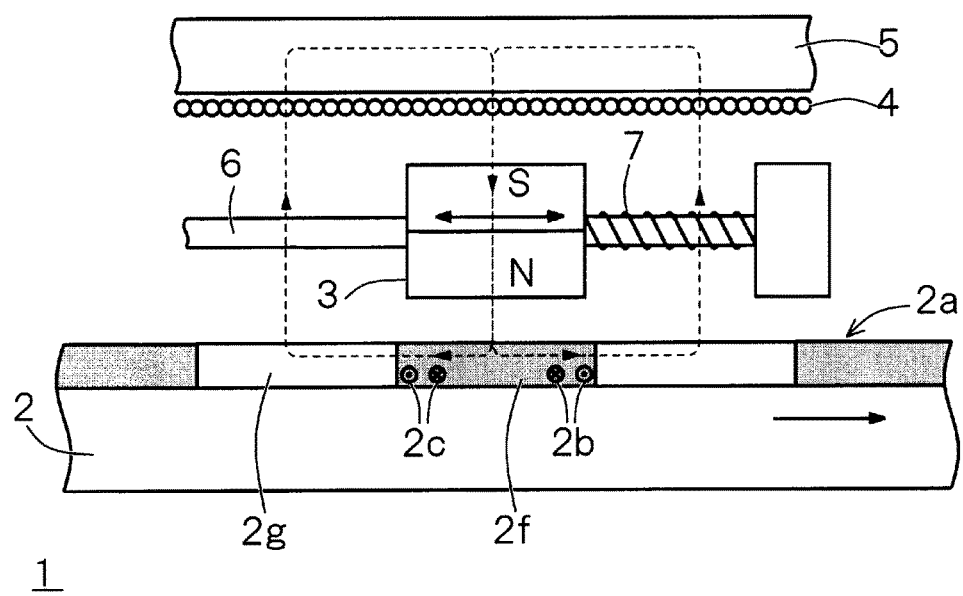
FIG. 8 is a front view of an example in which the non-contact power generator having the same structure as that of FIG. 4 is arranged close and opposed to a flat main surface of the moving body.
Figure 9:
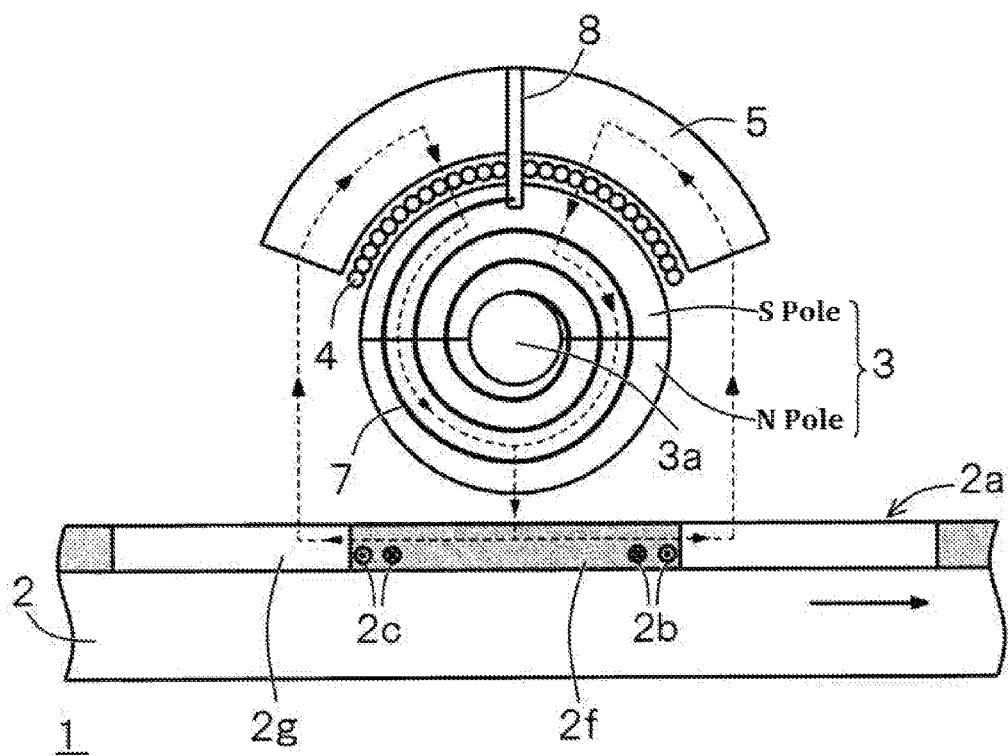
FIG. 9 is a front view of an example in which the non-contact power generator having the same structure as that of FIG. 5 is arranged close and opposed to a flat main surface of the moving body.

FIG. 8 illustrates an example in which the non-contact power generator 1 having the same configuration as that of FIG. 4 is opposed to a flat main surface 2a of the moving body 2 in proximity. FIG. 9 illustrates an example in which the non-contact power generator 1 having the same configuration as that of FIG. 4 is opposed to the flat main surface 2a of the moving body 2 in proximity.

Although the main surface 2a of the moving body 2 shown in FIGS. 8 and 9 is flat, first portions 2f and second portions 2g that are alternately arranged are formed in the main surface 2a. The first portions 2f have a magnetic permeability and/or an electric conductivity different from that/those of the second portions 2g. The moving body 2 moves in a direction in which the first portion 2f and the second portion 2g are arranged.

In order to move or rotate the magnet 3 by utilizing the reluctance force, it is necessary that the first portions 2f and the second portions 2g of the moving body 2 have different magnetic permeabilities from each other. For example, if the magnetic permeability of the first portions 2f is higher than that of the second portions 2g, the magnet 3 moves or rotates in the moving direction of the moving body 2 when the first portion 2f is opposed to the magnet 3, and the magnet 3 moves or rotates in the opposite direction by the bias force of the biasing member 7 when the second portion 2g is opposed to the magnet 3.

In order to move or rotate the magnet 3 by utilizing the reaction force caused by the eddy currents, it is necessary that the first portions 2f and the second portions 2g of the moving body 2 have different electric conductivities from each other. For example, if the electric conductivity of the first portions 2f is higher than that of the second portions 2g, the magnet 3 moves or rotates in the moving direction of the moving body 2 when the first portion 2f is opposed to the magnet 3, and the magnet 3 moves or rotates in the opposite direction by the bias force of the biasing member 7 when the second portion 2g is opposed to the magnet 3.

As described above, even when the magnet 3 is opposed to the flat main surface 2a of the moving body 2, the magnet 3 can be moved or rotated in the both directions by alternately changing at least the magnetic permeability or the electric conductivity or both on the main surface 2a.

Fifth Embodiment

In the fifth embodiment, the magnet 3 is vertically oscillated.

Figure 10:
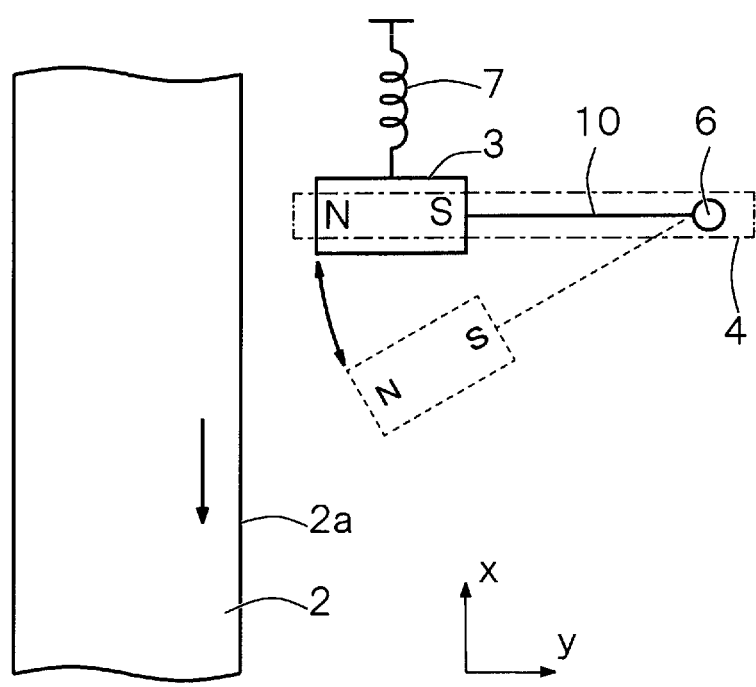
FIG. 10 is a front view of a non-contact power generator according to a fifth embodiment of the invention.

FIG. 10 is a front view of the non-contact power generator 1 according to the fifth embodiment of the invention. The non-contact power generator 1 of FIG. 10 includes the magnet 3 arranged to be separated from the main surface 2a extending in a first direction x of the moving body 2 that moves in the first direction x, the biasing member 7 that biases the magnet 3 in the first direction x or the opposite direction, the shaft member 6 for the magnet 3 that extends in a second direction y intersecting the first direction x and is disposed at a distance from the magnet 3, a connecting member 10 that is connected to the magnet 3 and the shaft member 6 for rotating the magnet 3 around the shaft member 6, and the coil 4 to which the magnetic flux of the magnet 3 is linked.

The first direction x is, for example, a vertical direction, and the second direction y is, for example, a horizontal direction. For example, the moving body 2 moves downward, which is the vertical direction or the gravity direction. It should be noted that the moving body 2 may move in a direction opposite to the gravity direction (upward) or may move in both of the gravity direction and the opposite direction.

The magnet 3 is connected to the shaft member 6 by the connecting member 10, and the magnet 3 is rotatable around the shaft member 6. In the initial state, the magnet 3 is supported by the biasing member 7 and the connecting member 10 and rests at a predetermined position. At this rest position, one magnetic-pole end surface of the magnet 3 is opposed to the main surface 2a of the moving body 2.

As a typical example of the initial state, when the main surface 2a of the moving body 2 extends in the vertical direction and the biasing direction of the biasing member 7 is upward, the extending direction of the connecting member 10 is arranged in the horizontal direction and the magnet 3 stably rests.

The coil 4 is disposed at a position where the magnetic flux from the magnet 3 is linked with the coil For example, the coil 4 may be arranged so as to surround the place where the magnet 3 is disposed in the initial state.

When the moving body 2 moves in one direction (for example, downward or the direction of gravity) from the initial state, eddy currents are generated in the main surface 2a of the moving body 2, and the magnet 3 is moved in the moving direction of the moving body 2 by the reaction force caused by the eddy currents. For example, when the movable body 2 moves downward, the magnet 3 also moves downward. When the magnet 3 moves downward, a bias force that urges the magnet 3 to return to the original balanced position is accumulated in the biasing member 7.

Since the connecting member 10 is connected to the magnet 3 in addition to the biasing member 7, the distance between the magnetic-pole end surface of the magnet 3 and the main surface 2a of the moving body 2 becomes large as indicated by a broken line in FIG. 10. As a result, the bias force of the biasing member 7 becomes larger than the reaction force by the eddy currents, and the magnet 3 moves in the direction opposite to the moving direction of the moving body 2 (for example, upward). When the magnet 3 moves upward, the distance between the magnetic-pole end surface of the magnet 3 and the main surface 2a of the moving body 2 becomes short, and the bias force that urges the magnet 3 to move downward is accumulated in the biasing member 7. Consequently the magnet 3 moves downward again. By repeating the above operation, the magnet 3 oscillates in one direction and the opposite direction alternately while the moving body 2 is moving only in one direction.

When the magnet 3 oscillates up and down, for example, the magnetic flux linked with the coil 4 periodically changes in accordance with the oscillation period of the magnet 3, and an electromotive force is induced in the coil 4.

As described above, in the fifth embodiment, the magnet 3 is opposed at a distance to the main surface 2a of the moving body 2, the magnet 3 is biased by the biasing member 7, and the magnet 3 is configured movable around the shaft member 6 via the connecting member 10. With such a configuration, it is possible to oscillate the magnet 3 in one direction and the opposite direction even if the moving body 2 moves only in one direction.

The magnet 3 in the above-described first to fifth embodiments may be a permanent magnet or electromagnet. The shapes of the magnet 3 and the yoke 5 are not limited to those shown in the figures. Further, the yoke 5 may be omitted in some cases.

Aspects of the invention are not limited to the foregoing embodiments and embrace various modifications conceivable by those skilled in the art. Advantageous effects of the invention are also not limited to the above-described ones. That is, various additions, changes, and partial omission are possible as long as they will not depart from the conceptual ideas and spirit of the invention derived from contents defined in the claims and equivalents thereof.

What is claimed is:

1. A non-contact power generator, comprising:
a magnet opposed at a distance to a main surface of a moving body that moves in one direction and a direction opposite to the one direction, the magnet being movable along a shaft that extends in the moving direction of the moving body, and the magnet generating a magnetic flux that passes the main surface;
a coil disposed at a distance from a surface of the magnet that faces away from the main surface of the moving body, the coil being linked with the magnetic flux from the magnet; and
a magnetic flux guide member disposed in at least a part of a magnetic path of the magnetic flux linked with the coil, wherein
the magnet is moved along the shaft in the moving direction of the moving body at a speed lower than a moving speed of the moving body by a reaction force acting on the magnet on a basis of eddy currents generated in the main surface of the moving body in such a direction as to hinder a change of the magnetic flux from the magnet.

2. The non-contact power generator according to claim 1, wherein
a distance between the main surface of the moving body and a surface of the magnet opposed to the main surface is constant while the magnet moves along the shaft.

3. The non-contact power generator according to claim 1, wherein
the coil has a planar shape that is disposed in a direction intersecting a direction of the magnetic flux from the magnet, and
the magnetic flux guide member is disposed on a side opposite to the magnet with the coil interposed therebetween.

4. The non-contact power generator according to claim 1, wherein
the magnet is a permanent magnet or an electromagnet.

5. A non-contact power generator, comprising:
a magnet opposed at a distance to a main surface of a moving body in which convex portions and concave portions are alternately arranged on the main surface, the moving body moving or reciprocating in a direction in which the convex portions and the concave portions are arranged, the magnet being movable along a shaft that extends in the moving direction of the moving body, and the magnet generating a magnetic flux that passes the main surface;
a biasing member biasing the magnet along the shaft;
a coil disposed at a distance from a surface of the magnet that faces away from the main surface of the moving body, the coil being linked with the magnetic flux from the magnet; and
a magnetic flux guide member disposed in at least a part of a magnetic path of the magnetic flux linked with the coil, wherein
when the magnet is opposed to the convex portion, the magnet is moved along the shaft in the moving direction of the moving body by a reaction force that acts on the magnet on a basis of eddy currents generated in the convex portion or by a reluctance force acting between the convex portion and a surface of the magnet opposed to the convex portion or by both the reaction force and the reluctance force, and
when the magnet is opposed to the concave portion, the magnet is moved in a direction opposite to the moving direction of the moving body by a bias force of the biasing member.

6. The non-contact power generator according to claim 5, wherein
when the magnetic permeability of the moving body is higher than a first threshold value and the electric conductivity is lower than a second threshold value, the magnet is moved by the reluctance force rather than the reaction force.

7. The non-contact power generator according to claim 5, wherein
the coil has a planar shape that is disposed in a direction intersecting a direction of the magnetic flux from the magnet, and the magnetic flux guide member is disposed on a side opposite to the magnet with the coil interposed therebetween.

8. The non-contact power generator according to claim 5, wherein
the magnet is a permanent magnet or an electromagnet.

9. A non-contact power generator, comprising:
a magnet opposed at a distance to a flat main surface of a moving body in which first portions and second portions are alternately arranged on the main surface, the second portions have a magnetic permeability and/or an electric conductivity lower than that/those of the second portions, the moving body moving in a direction in which the first portions and the second portions are arranged, the magnet being movable along a shaft that extends in the moving direction of the moving body, and the magnet generates a magnetic flux that passes the main surface;
a biasing member biasing the magnet along the shaft;
a coil disposed at a distance from a surface of the magnet that faces away from the main surface of the moving body, the coil being linked with the magnetic flux from the magnet; and
a magnetic flux guide member disposed in a part of a magnetic path of the magnetic flux linked with the coil, wherein
when the magnet is opposed to the first portion, the magnet is moved along the shaft in the moving direction of the moving body by a reaction force that acts on the magnet on a basis of eddy currents generated in the first portion or by a reluctance force acting between the first portion and a surface of the magnet opposed to the first portion or by both the reaction force and the reluctance force, and
when the magnet is opposed to the second portion, the magnet is moved in a direction opposite to the moving direction of the moving body by a bias force of the biasing member.

10. The non-contact power generator according to claim 9, wherein
when the magnetic permeability of the moving body is higher than a first threshold value and the electric conductivity is lower than a second threshold value, the magnet is moved by the reluctance force rather than the reaction force.

11. The non-contact power generator according to claim 9, wherein
the coil has a planar shape that is disposed in a direction intersecting a direction of the magnetic flux from the magnet, and
the magnetic flux guide member is disposed on a side opposite to the magnet with the coil interposed therebetween.

12. The non-contact power generator according to claim 9, wherein
the magnet is a permanent magnet or an electromagnet.

13. A non-contact power generator, comprising:
a magnet opposed at a distance to a main surface of a moving body in which convex portions and concave portions are alternately arranged on the main surface, the moving body moving in a direction in which the convex portions and the concave portions are arranged, the magnet being rotatable around a shaft that extends in a direction intersecting the moving direction of the moving body, and the magnet is magnetized in a direction toward the main surface or in a direction opposite thereto;
a biasing member biasing the magnet in a rotation direction of the shaft;
a coil disposed at a distance from a surface of the magnet that faces away from the main surface of the moving body, the coil being linked with the magnetic flux from the magnet; and
a magnetic flux guide member disposed in at least a part of a magnetic path of the magnetic flux linked with the coil, wherein
when the magnet is opposed to the convex portion, the magnet is rotated around the shaft in a rotation direction according to the moving direction of the moving body by a reaction force that acts on the magnet on a basis of eddy currents generated in the convex portion or by a reluctance force acting between the convex portion and a surface of the magnet opposed to the convex portion or by both the reaction force and the reluctance force, and
when the magnet is opposed to the concave portion, the magnet is rotated around the shaft in a direction opposite to the rotation direction by a bias force of the biasing member.

14. The non-contact power generator according to claim 13, wherein
the magnet has a cylindrical body disposed on an outer peripheral surface side of the shaft,
the coil is disposed in a circular arc surface shape along at least a part of an outer peripheral surface of the magnet, and
the magnetic flux guide member is opposed to a surface of the coil that faces away from the magnet.

15. The non-contact power generator according to claim 13, wherein
the magnet is a permanent magnet or an electromagnet.

16. A non-contact power generator, comprising:
a magnet disposed at a distance from a flat main surface of a moving body in which first portions and second portions are alternately arranged on the main surface, the second portions have a magnetic permeability and/or an electric conductivity lower than that/those of the first portions, the moving body moving in a direction in which the first portions and the second portions are arranged, the magnet being rotatable around a shaft that extends in a direction intersecting the moving direction of the moving body, and the magnet generates a magnetic flux that passes the main surface;
a biasing member biasing the magnet in a rotation direction of the shaft;
a coil disposed at a distance from a surface of the magnet that faces away from the main surface of the moving body, the coil being linked with the magnetic flux from the magnet; and
a magnetic flux guide member disposed in a part of a magnetic path of the magnetic flux linked with the coil, wherein
when the magnet is opposed to the first portion, the magnet is rotated around the shaft in a rotation direction according to the moving direction of the moving body by a reaction force that acts on the magnet on a basis of eddy currents generated in the first portion or by a reluctance force acting between the first portion and a surface of the magnet opposed to the first portion or by both the reaction force and the reluctance force, and when the magnet is opposed to the second portion, the magnet is rotated around the shaft in a direction opposite to the rotation direction by a bias force of the biasing member.

17. The non-contact power generator according to claim 16, wherein
the magnet has a cylindrical body disposed on an outer peripheral surface side of the shaft,
the coil is disposed in a circular arc surface shape along at least a part of an outer peripheral surface of the magnet, and
the magnetic flux guide member is opposed to a surface of the coil that faces away from the magnet.

18. The non-contact power generator according to claim 16, wherein
the magnet is a permanent magnet or an electromagnet.

19. A non-contact power generator, comprising:
a magnet opposed at a distance to a main surface of a moving body that moves in a first direction;
a biasing member biasing the magnet in the first direction or a direction opposite to the first direction;
a shaft member disposed at a distance from the magnet and extending in a second direction intersecting the first direction;
a connecting member connected to the magnet and the shaft member for rotating the magnet around the shaft member; and
a coil with which a magnetic flux of the magnet is linked, wherein
while the moving body is moving in the first direction, the magnet oscillates in the first direction and a direction opposite to the first direction by a reaction force acting on the magnet on a basis of eddy currents generated in the main surface of the moving body in such a direction as to hinder a change of the magnetic flux from the magnet and by a bias force of the biasing member.

20. The non-contact power generator according to claim 19, wherein
the magnet is a permanent magnet or an electromagnet.

* * * * *